US010608239B2

(12) United States Patent
Suzuki

(10) Patent No.: US 10,608,239 B2
(45) Date of Patent: Mar. 31, 2020

(54) METHOD FOR PRODUCING ELECTRODE BODY

(71) Applicant: TOYOTA JIDOSHA KABUSHIKI KAISHA, Toyota-shi, Aichi-ken (JP)

(72) Inventor: Tomoya Suzuki, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 15/058,937

(22) Filed: Mar. 2, 2016

(65) Prior Publication Data

US 2016/0260963 A1 Sep. 8, 2016

(30) Foreign Application Priority Data

Mar. 5, 2015 (JP) ................................ 2015-043801

(51) Int. Cl.

*H01M 4/04* (2006.01)
*H01M 10/052* (2010.01)
*H01M 10/04* (2006.01)
*H01M 10/0562* (2010.01)
*H01M 4/131* (2010.01)

(Continued)

(52) U.S. Cl.

CPC ..... *H01M 4/0471* (2013.01); *H01M 10/0413* (2013.01); *H01M 10/052* (2013.01); *H01M 10/0562* (2013.01); *H01M 4/043* (2013.01); *H01M 4/0404* (2013.01); *H01M 4/131* (2013.01); *H01M 4/133* (2013.01); *H01M 4/1391* (2013.01); *H01M 4/1393* (2013.01); *H01M 2220/20* (2013.01); *H01M 2300/0068* (2013.01); *Y02E 60/122* (2013.01); *Y02P 70/54* (2015.11); *Y02T 10/7011* (2013.01)

(58) Field of Classification Search

CPC .................................................. H01M 4/0471
USPC ........................................................ 29/623.1
See application file for complete search history.

(56) References Cited

U.S. PATENT DOCUMENTS

2009/0123847 A1 5/2009 Okada et al.
2010/0112456 A1 5/2010 Kimura et al.

(Continued)

FOREIGN PATENT DOCUMENTS

CN 103975477 A 8/2014
JP 2008-270137 A 11/2008

(Continued)

*Primary Examiner* — Jonathan G Leong
(74) *Attorney, Agent, or Firm* — Oliff PLC

(57) ABSTRACT

A method for producing an electrode body, suppressing a decrease in capacity of an oxide active material while improving the Li-ion conductance of a sulfide solid electrolyte material. The method producing an electrode body, including a heating step of heating an oxide active material and amorphous sulfide solid electrolyte material in state where the oxide active material and amorphous sulfide solid electrolyte material are in contact with each other, in which the oxide active material is a rock salt bed type active material, the sulfide solid electrolyte material contains a Li element, P element, and S element, and includes an ion conductor containing PS43—as main component of an anion structure, LiI, and LiBr, and heating temperature in the step is equal to or higher than the crystallization onset temperature of the sulfide solid electrolyte material and equal to or lower than the sulfide solid electrolyte material crystallization peak temperature.

20 Claims, 2 Drawing Sheets

10
14(11)
12
13(11)

(51) Int. Cl.

| | |
|---|---|
| *H01M 4/133* | (2010.01) |
| *H01M 4/1391* | (2010.01) |
| *H01M 4/1393* | (2010.01) |

(56) References Cited

U.S. PATENT DOCUMENTS

| | | | | |
|---|---|---|---|---|
| 2014/0234725 | A1* | 8/2014 | Ogawa | H01M 4/131<br>429/304 |
| 2015/0207170 | A1* | 7/2015 | Aburatani | H01B 1/10<br>429/306 |
| 2016/0149259 | A1 | 5/2016 | Osada et al. | |

FOREIGN PATENT DOCUMENTS

| | | | | |
|---|---|---|---|---|
| JP | 2009-140911 | A | 6/2009 | |
| JP | 2013-089330 | A | 5/2013 | |
| JP | WO 2013161350 | A1 * | 10/2013 | H01M 4/131 |
| JP | WO 2014010172 | A1 * | 1/2014 | H01B 1/10 |
| WO | 2014/208239 | A1 | 12/2014 | |

* cited by examiner

FIG. 1A
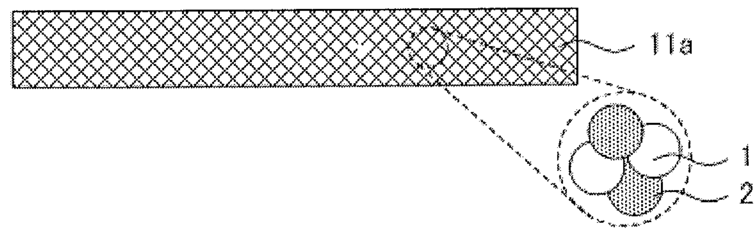
FIG. 1B
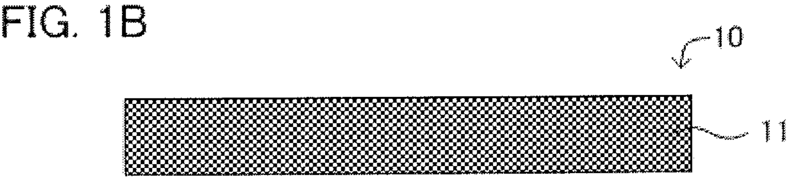
FIG. 2A
10
11
FIG. 2B
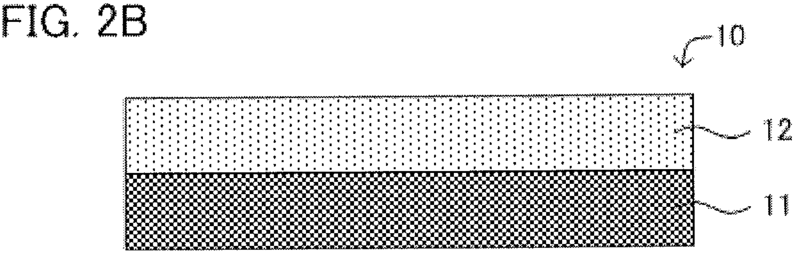
FIG. 2C
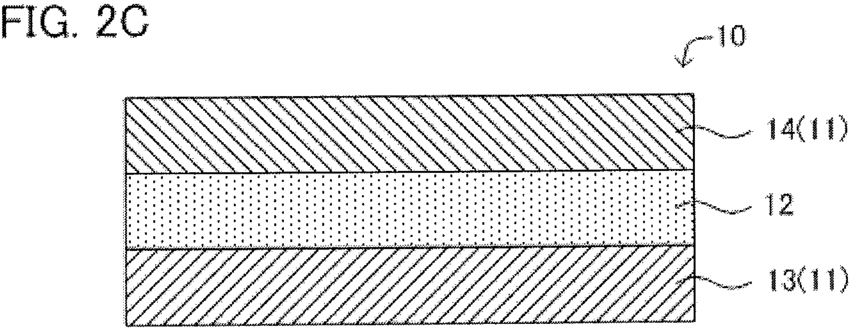

METHOD FOR PRODUCING ELECTRODE BODY

TECHNICAL FIELD

The present invention relates to a method for producing an electrode body, the method capable of suppressing a decrease in the capacity of an oxide active material while improving the Li ion conductance of a sulfide solid electrolyte material.

BACKGROUND ART

In recent years, with rapid spread of information-related equipment and communication equipment such as personal computers, video cameras, and mobile phones, the development of batteries used as a power source therefor has been emphasized. Further, also in the automobile industry and the like, the development of batteries having high output and high capacity for electric vehicles or hybrid vehicles has been advanced. Among various batteries, a lithium battery has been presently noticed from the viewpoint of a high energy density.

A liquid electrolyte containing a flammable organic solvent is used for a presently commercialized lithium battery, so that the installation of a safety device for restraining temperature rise during a short circuit and a structure for preventing a short circuit are necessary therefor. To the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery. Furthermore, a sulfide solid electrolyte material has been known as a solid electrolyte material used for such a solid electrolyte layer.

The sulfide solid electrolyte material has high Li ion conductivity and thus is useful for achieving high-output batteries. For this reason, various studies have been heretofore conducted on such a sulfide solid electrolyte material. For example, Patent Literature 1 discloses a composite material layer including sulfide glass uncalcined and an active material, in which the sulfide glass and the active material are pressure-formed and in contact with each other. Furthermore, Patent Literature 1 discloses that the sulfide glass is calcined at a temperature of the glass transition point or higher of the sulfide glass to have a portion of the sulfide glass transitioned to glass ceramic.

CITATION LIST

Patent Literature

Patent Literature 1: Japanese Patent Application (JP-A) No. 2008-270137

SUMMARY OF INVENTION

Technical Problem

For example, when a sulfide solid electrolyte material represented by LiI—LiBr—$Li_3PS_4$ is heated, crystallinity is improved and Li ion conductance is also improved. On the other hand, when such a sulfide solid electrolyte material is heated together with an oxide active material of a rock salt bed type, a decrease in the capacity of the oxide active material may occur in some cases.

The present invention has been made in view of the above-described circumstances, and a main object thereof is to provide a method for producing an electrode body, the method capable of suppressing a decrease in the capacity of the oxide active material while improving the Li ion conductance of the sulfide solid electrolyte material.

Solution to Problem

To achieve the above object, the present invention provides a method for producing an electrode body, comprising a heating step of heating an oxide active material and an amorphous sulfide solid electrolyte material in a state where the oxide active material and the amorphous sulfide solid electrolyte material are in contact with each other, wherein the oxide active material is a rock salt bed type active material, the sulfide solid electrolyte material contains a Li element, a P element, and a S element, and comprises an ion conductor containing $PS_4^{3-}$ as a main component of an anion structure, LiI, and LiBr, and a heating temperature in the heating step is equal to or higher than the crystallization onset temperature of the sulfide solid electrolyte material but equal to or lower than the crystallization peak temperature of the sulfide solid electrolyte material.

According to the present invention, when heating is performed under a predetermined temperature condition, a decrease in the capacity of the oxide active material can be suppressed while the Li ion conductance of the sulfide solid electrolyte material is improved. As a result, it is possible to obtain an electrode body with high Li ion conductance of the sulfide solid electrolyte material and large capacity of the oxide active material.

In the above invention, the oxide active material and the sulfide solid electrolyte material are preferably pressed in the heating step.

In the above invention, the heating temperature in the heating step is preferably in the range of 140° C. to 160° C.

Advantageous Effects of Invention

The present invention exhibits an effect in which a decrease in the capacity of an oxide active material can be suppressed while the Li ion conductance of a sulfide solid electrolyte material is improved.

BRIEF DESCRIPTION OF DRAWINGS

FIGS. 1A and 1B are schematic cross-sectional views illustrating an example of a method for producing an electrode body of the present invention;

FIGS. 2A to 2C are schematic cross-sectional views illustrating an example of an electrode body in the present invention;

DESCRIPTION OF EMBODIMENTS

Figure 3:
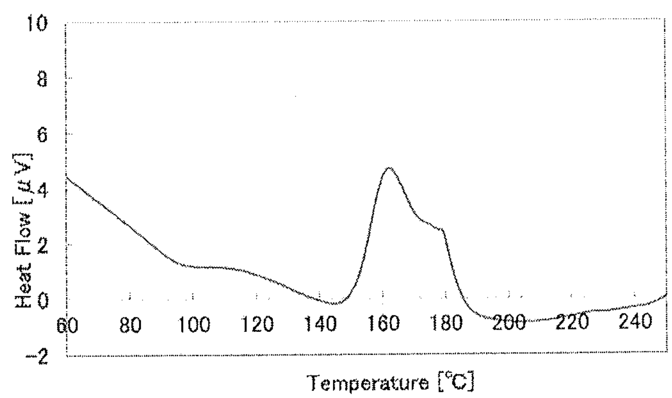
FIG. 3 shows the result of the thermal analysis of an amorphous sulfide solid electrolyte material obtained in Production Example.

Hereinafter, a method for producing an electrode body of the present invention will be described in detail.

FIGS. 1A and 1B are schematic cross-sectional views illustrating an example of a method for producing an electrode body of the present invention. In FIGS. 1A and 1B, an electrode active material layer forming member 11*a* is formed in which an oxide active material 1 and an amorphous sulfide solid electrolyte material 2 are in contact with each other (FIG. 1A). The oxide active material 1 is a rock salt bed type active material and the amorphous sulfide solid electrolyte material 2 is, for example, LiI—LiBr—$Li_3PS_4$. Next, the electrode active material layer forming member 11*a* is heated under the condition of a temperature equal to or higher than the crystallization onset temperature of the sulfide solid electrolyte material 2 but equal to or lower than the crystallization peak temperature of the sulfide solid electrolyte material 2, thereby obtaining an electrode body 10 (an electrode active material layer 11).

According to the present invention, when heating is performed under a predetermined temperature condition, a decrease in the capacity of the oxide active material can be suppressed while the Li ion conductance of the sulfide solid electrolyte material is improved. As a result, it is possible to obtain an electrode body with high Li ion conductance of the sulfide solid electrolyte material and large capacity of the oxide active material.

Specifically, when heating is performed at a temperature equal to or higher than the crystallization onset temperature, crystallinity of the sulfide solid electrolyte material is improved. As a result, ion conductance of the sulfide solid electrolyte material is improved and thus it is possible to reduce a battery resistance. On the other hand, when heating is performed at a temperature equal to or lower than the crystallization peak temperature, a decrease in the capacity of the oxide active material can be suppressed. The reason why a decrease in the capacity of the oxide active material can be suppressed is considered that the reaction between the oxide active material and the sulfide solid electrolyte material can be suppressed.

More specifically, the reason for this is considered that, if the heating temperature is excessively high, an oxygen atom (O) becomes easy to be pulled out of the oxide active material and the oxygen atom chemically reacts with a phosphorus atom (P) or sulfur atom (S) of the sulfide solid electrolyte material. The degree of ease of pulling-out of the oxygen atom (O) is greatly influenced by the bonding state of oxygen in the oxide active material. The oxide active material in the present invention is a rock salt bed type active material and is considered that the bonding state of oxygen is at the same level.

Incidentally, Patent Literature 1 describes that the sulfide glass is calcined at a temperature of a glass transition point. However, in the amorphous sulfide solid electrolyte material in the present invention, a glass transition point is usually not observed.

Hereinafter, the method for producing an electrode body of the present invention will be described in more detail.

1. Heating Step

The heating step in the present invention is a step of heating an oxide active material and an amorphous sulfide solid electrolyte material in a state where the oxide active material and the amorphous sulfide solid electrolyte material are in contact with each other. Further, the present invention has a feature in that a heating temperature in the heating step is equal to or higher than the crystallization onset temperature of the sulfide solid electrolyte material but equal to or lower than the crystallization peak temperature of the sulfide solid electrolyte material.

The crystallization onset temperature and the crystallization peak temperature can be measured by performing thermal analysis (DTA or DSC) on the amorphous sulfide solid electrolyte material. The crystallization peak temperature is a temperature at which Heat Flow accompanied with crystallization peaks. The crystallization onset temperature indicates, at the low temperature side of the peak accompanied with crystallization, a temperature in the range of ($T_1$-5° C.) to $T_1$ when a temperature at which the slope of Heat Flow curve becomes positive is designated as $T_1$ (° C.).

(1) Oxide Active Material

The oxide active material in the present invention is usually a rock salt bed type active material. For example, the oxide active material preferably contains at least one of Co, Mn, Ni, V, and Cr, and more preferably contains at least one of Co, Mn, and Ni. Furthermore, the oxide active material may contain Co, Mn, and Ni. Examples of the oxide active material may include $LiCoO_2$, $LiNiO_2$, $LiMnO_2$, $LiCo_{1/3}Ni_{1/3}Mn_{1/3}O_2$, $LiVO_2$, and $LiCrO_2$. Examples of the shape of the oxide active material may include a particulate shape. Furthermore, the average particle diameter ($D_{50}$) of the oxide active material is, for example, preferably in the range of 0.1 μm to 50 μm.

The oxide active material preferably has a coating layer configured by an ion conductive oxide on the surface thereof. The reason for this is that it is possible to suppress the reaction between the oxide active material and the sulfide solid electrolyte material. Examples of the ion conductive oxide may include a compound represented by General Formula: $Li_xAO_y$ (A represents B, C, Al, Si, P, S, Ti, Zr, Nb, Mo, Ta, or W, and "x" and "y" represent positive numbers). Specific examples thereof may include $Li_3BO_3$, $LiBO_2$, $Li_2CO_3$, $LiAlO_2$, $L_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$, and $Li_2WO_4$. The thickness of the ion conductive oxide is, for example, in the range of 0.1 nm to 100 nm and preferably in the range of 1 nm to 20 nm.

Incidentally, the expression "a state where the oxide active material and the amorphous sulfide solid electrolyte material are in contact with each other" in the present invention means a state where both of them are indirect contact with each other and a state where both of them are in contact with each other with the ion conductive oxide interposed therebetween.

(2) Amorphous Sulfide Solid Electrolyte Material

The amorphous sulfide solid electrolyte material in the present invention is a material that contains a Li element, a P element, and an S element, and comprises an ion conductor containing $PS_4^{3-}$ as a main component of an anion structure, LiI, and LiBr. The term "amorphous" means a state where crystallinity can be improved by heating, and may be the case of being completely amorphous or the case of being slightly crystalline. Furthermore, the expression "being completely amorphous" means a state where a peak of crystal is not observed by X-ray diffraction.

The sulfide solid electrolyte material in the present invention comprises a specific ion conductor, LiI, and LiBr. At least a part of LiI and LiBr is preferably present as, each as a LiI component and a LiBr component, being incorporated to the structure of the ion conductor.

The ion conductor in the present invention contains a Li element, a P element, and a S element, and contains $PS_4^{3-}$ as a main component of an anion structure. $PS_4^{3-}$ corresponds to an anion structure of an ortho-composition. The ortho generally means that a compound having the highest degree of hydration among the oxoacids obtainable by hydrating an identical oxide. In the present invention, a crystal composition in which $Li_2S$ has been added to the largest extent to a sulfide is referred to as the ortho-composition. For example, in the $Li_2S$—$P_2S_5$ system, $Li_3PS_4$ corresponds to the ortho-composition.

The expression "containing $PS_4^{3-}$ as a main component of an anion structure" means that the ratio of $PS_4^{3-}$ is 60 mol % or more relative to the total anion structure in the ion conductor. The ratio of $PS_4^{3-}$ is preferably 70 mol % or more, more preferably 80 mol % or more, and further preferably 90 mol % or more. Incidentally, the ratio of $PS_4^{3-}$ can be decided by methods such as a Raman spectrometric method, NMR, or XPS.

The sulfide solid electrolyte material preferably contains no $Li_2S$. The reason for this is that it is possible to obtain a sulfide solid electrolyte material with less hydrogen sulfide generation amount. $Li_2S$ reacts with water to generate a hydrogen sulfide. For example, if the ratio of $Li_2S$ contained in a raw material composition is large, $Li_2S$ is likely to remain. The fact "containing no $Li_2S$" can be confirmed by X-ray diffraction. Specifically, in the case of having no peaks of $Li_2S$ ($2\theta=27.0°$, 31.2°, 44.8°, and 53.1°), it can be determined that $Li_2S$ is not contained.

The sulfide solid electrolyte material preferably contains no cross-linking sulfur. The reason for this is that it is possible to obtain a sulfide solid electrolyte material with less hydrogen sulfide generation amount. The term "cross-linking sulfur" indicates cross-linking sulfur in a compound obtained by a reaction of raw materials. For example, cross-linking sulfur with an $S_3P$—S—$PS_3$ structure obtained by a reaction of $Li_2S$ and $P_2S_5$ corresponds thereto. Such cross-linking sulfur easily reacts with water to easily generate a hydrogen sulfide. For example, if the ratio of $Li_2S$ contained in the raw material composition is small, cross-linking sulfur is easily generated. The fact "containing no cross-linking sulfur" can be confirmed by Raman spectrum measurement.

For example, in the case of a $Li_2S$—$P_2S_5$-based sulfide solid electrolyte material, a peak of the $S_3P$—S—$PS_3$ structure usually appears at 402 $cm^{-1}$. Thus, it is preferable that this peak be not detected. Furthermore, a peak of the $PS_4^{3-}$ structure usually appears at 417 $cm^{-1}$. In the present invention, the intensity $I_{402}$ at 402 $cm^{-1}$ is preferably smaller than the intensity $I_{417}$ at 417 $cm^{-1}$. More specifically, the intensity $I_{402}$ is, for example, preferably 70% or less, more preferably 50% or less, and further preferably 35% or less relative to the intensity $I_{417}$.

The sulfide solid electrolyte material is preferably formed by using a raw material composition containing $Li_2S$, $P_2S_5$, LiI, and LiBr. The ratio of $Li_2S$ relative to the total of $Li_2S$ and $P_2S_5$ is, for example, in the range of 70 mol % to 80 mol %, preferably in the range of 72 mol % to 78 mol %, and more preferably in the range of 74 mol % to 76 mol %. Furthermore, the ratio of LiI in the sulfide solid electrolyte material is, for example, in the range of 1 mol % to 30 mol %, and preferably in the range of 10 mol % to 25 mol %. The ratio of LiBr in the sulfide solid electrolyte material is, for example, in the range of 1 mol % to 30 mol %, and preferably in the range of 10 mol % to 25 mol %.

Examples of the shape of the sulfide solid electrolyte material may include a particulate shape. The average particle diameter ($D_{50}$) of the sulfide solid electrolyte material is, for example, in the range of 0.1 μm to 50 μm and preferably in the range of 0.1 μm to 5 μm.

The method for producing a sulfide solid electrolyte material is not particularly limited, but examples thereof may include a method for amorphizing a raw material composition. As the method for amorphizing a raw material composition, for example, a mechanical milling method and a melt quenching method can be exemplified. The mechanical milling method may be a dry mechanical milling or a wet mechanical milling, but the latter is preferable. The reason for this is that the raw material composition can be prevented from adhering to a wall surface of a vessel or the like so that a sulfide solid electrolyte material with higher amorphous properties can be obtained.

(3) Heating Target

In the present invention, the oxide active material and the amorphous sulfide solid electrolyte material are heated in a state where the oxide active material and the amorphous sulfide solid electrolyte material are in contact with each other. Examples of an aspect in which the oxide active material and the amorphous sulfide solid electrolyte material are in contact with each other may include an aspect in which the oxide active material and the sulfide solid electrolyte material are in contact with each other in the electrode active material layer (a first aspect) and an aspect in which the oxide active material and the sulfide solid electrolyte material are in contact with each other at the interface between the electrode active material layer and the solid electrolyte layer (a second aspect).

The first aspect is, for example, an aspect illustrated in FIG. 2A which will be described below. In FIG. 2A, the oxide active material and the sulfide solid electrolyte material are in contact with each other in a single layer that is the electrode active material layer 11. The method for forming an electrode active material layer is not particularly limited, but for example, a slurry method can be exemplified. In the slurry method, a slurry is applied to a substrate and then the substrate is dried, thereby obtaining an electrode active material layer. As a method for preparing a slurry, a method of kneading an oxide active material and an amorphous sulfide solid electrolyte material in a dispersion medium can be exemplified. The dispersion medium is preferably a material with which a material to be kneaded does not react.

Examples of the kneading method may include a general method using an ultrasonic homogenizer, a shaker, a thin film rotating mixer, a dissolver, a homomixer, a kneader, a roll mill, a sand mill, an attritor, a ball mill, a vibrator mill, or a high-speed impeller mill. Examples of the coating method may include general methods such as a doctor blade method, a die coating method, a gravure coating method, a spray coating method, an electrostatic coating method, and a bar coating method. Examples of the drying method may include general methods such as warm air or hot air drying, infrared drying, drying under reduced pressure, and dielectric heating drying.

The second aspect is, for example, an aspect illustrated in FIG. 2B which will be described below. In FIG. 2B, the oxide active material and the sulfide solid electrolyte material are in contact with each other at the interface between the electrode active material layer 11 and a solid electrolyte layer 12. The method for forming a solid electrolyte layer is not particularly limited, but for example, the same slurry method as described above can be exemplified.

(4) Heating Step

In the present invention, the heating temperature in the heating step is usually equal to or higher than the crystallization onset temperature of the sulfide solid electrolyte material but equal to or lower than the crystallization peak temperature of the sulfide solid electrolyte material. The measuring method and other factors of the crystallization onset temperature and the crystallization peak temperature are as described above.

The crystallization onset temperature is, for example, 120° C. or higher, may be 130° C. or higher, and may be 140° C. or higher. The crystallization peak temperature is, for example, 180° C. or lower, may be 170° C. or lower, and may be 160° C. or lower. Furthermore, the heating temperature is, for example, 120° C. or higher, may be 130° C. or higher, and may be 140° C. or higher. On the other hand, the heating temperature is, for example, 180° C. or lower, may be 170° C. or lower, and may be 160° C. or lower.

The heating time is, for example, in the range of 1 minute to 100 hours. The heating atmosphere is preferably an inert gas atmosphere (for example, Ar gas atmosphere) or a reduced pressure atmosphere (in particular, vacuum). The reason for this is that the deterioration (for example, oxidation) of the sulfide solid electrolyte can be prevented. The heating method is not particularly limited, but examples thereof may include a method of using a calcination furnace.

Furthermore, in the present invention, it is preferable that the oxide active material and the sulfide solid electrolyte material be pressed in the heating step. When heating and pressing are performed at the same time, the amorphous sulfide solid electrolyte material is pressed in a state where the amorphous sulfide solid electrolyte material is softened by heating and thus a contact area of the oxide active material and the sulfide solid electrolyte material increases. As a result, the electrode body can be densified and thus a battery resistance can be reduced. That is, when heating and pressing are performed at the same time, it is possible to utilize two effects, that is, an effect of reducing resistance by an increase in contact area and an effect of reducing resistance by improved crystallinity of the sulfide solid electrolyte material. Incidentally, in a case where pressing is performed without heating, usually, it is not possible to achieve sufficient densification. The pressing pressure is not particularly limited, but is, for example, in the range of 100 MPa to 1000 MPa and preferably in the range of 200 MPa to 800 MPa.

2. Electrode Body

In the present invention, it is possible to obtain a sulfide solid electrolyte material with improved crystallinity by heating. In the heated sulfide solid electrolyte material, at least a part of an amorphous portion is preferably crystallized. The heated sulfide solid electrolyte material preferably has peaks at $2\theta=20.2°$ and $23.6°$ in X-ray diffraction measurement using a CuKα ray. These peaks are the peak of a crystal phase with high Li ion conductivity. Incidentally, this crystal phase may be referred to as a high Li ion conducting phase in some cases. Here, the peak at $2\theta=20.2°$ indicates not only the peak precisely at $2\theta=20.2°$ but also a peak in the range of $2\theta=20.2°\pm0.5°$. The same is applied to the peak at $2\theta=23.6°$. The high Li ion conducting phase usually has peaks at $2\theta=29.4°$, $37.8°$, $41.1°$, and $47.0°$ in addition to $2\theta=20.2°$ and $23.6°$. These peak positions may also shift in the range of $\pm0.5°$. In particular, the heated sulfide solid electrolyte material preferably has a single phase of the high Li ion conducting phase.

Furthermore, the sulfide solid electrolyte material of the present invention preferably has no peaks at $2\theta=21.0°$ and $28.0°$ in X-ray diffraction measurement using a CuKα ray. These peaks are the peak of a crystal phase which has lower Li ion conductivity than the high Li ion conducting phase. Incidentally, this crystal phase may be referred to as a low Li ion conducting phase in some cases. Here, the peak at $2\theta=21.0°$ indicates not only the peak precisely at $2\theta=21.0°$ but also a peak in the range of $2\theta=21.0°\pm0.5°$. The same is applied to the peak at $2\theta=28.0°$. Furthermore, the low Li ion conducting phase usually has peaks at $2\theta=32.0°$, $33.4°$, $38.7°$, $42.8°$, and $44.2°$ in addition to $2\theta=21.0°$ and $28.0°$. These peak positions may also shift in the range of $\pm0.5°$.

Further, the expression "having no peaks at $2\theta=21.0°$ and $28.0°$" in the present invention means that peaks are not confirmed at $2\theta=21.0°$ and $28.0°$, or the ratio $I_{20.2}/I_{21.0}$ of the intensity of the peak at $2\theta=20.2°$ relative to the intensity of the peak at $2\theta=21.0°$ is 2.5 or more. The ratio $I_{20.2}/I_{21.0}$ is preferably 5 or more, and more preferably 10 or more. On the other hand, the ratio $I_{12.0}/I_{120.2}$ is preferably 0.4 or less, preferably 0.2 or less, and further preferably 0.1 or less. Incidentally, the ratio of $I_{21.0}/I_{20.2}$ and the ratio of $I_{20.2}/I_{21.0}$ are in the inverse relationship.

The electrode body to be obtained by the present invention is provided with at least an electrode active material layer. The electrode active material layer may be a cathode active material layer or an anode active material layer. Furthermore, the electrode body may be provided with only the electrode active material layer, or may be further provided with other members. The electrode body 10 illustrated in FIG. 2A is an electrode body provided with only the electrode active material layer 11. In this case, the electrode active material layer contains an oxide active material and a sulfide solid electrolyte material. Specifically, in the electrode active material layer, the oxide active material and the sulfide solid electrolyte material are in contact with each other (the first aspect described above). Furthermore, the electrode active material layer may further contain at least one of a conductive material and a binder. Examples of the conductive material may include acetylene black, ketjen black, and carbon fiber. Examples of the binder may include an acrylic binder, a fluoride-containing binder such as PVDF or PTFE, and a rubber binder such as butadiene rubber. Furthermore, the rubber binder may be a hydrogenated rubber binder or a rubber binder which is hydrogenated and further has a functional group introduced to the terminal end. The thickness of the electrode active material layer is, for example, preferably in the range of 0.1 μm to 1000 μm.

The electrode body 10 illustrated in FIG. 2B is an electrode body provided with the electrode active material layer 11 and the solid electrolyte layer 12. In this case, the electrode active material layer contains an oxide active material and a sulfide solid electrolyte material, or the electrode active material layer contains an oxide active material and the solid electrolyte layer contains a sulfide solid electrolyte material. The former corresponds to the first aspect similarly to the case of FIG. 2A. The latter corresponds to a case where the oxide active material and the sulfide solid electrolyte material are in contact with each other at the interface between the electrode active material layer and the solid electrolyte layer (the second aspect described above). Furthermore, the electrode active material layer may contain an oxide active material and a sulfide solid electrolyte material, and the solid electrolyte layer may contain a sulfide solid electrolyte material. On the other hand, the solid electrolyte layer may contain the binder described above. The thickness of the solid electrolyte layer is, for example, preferably in the range of 0.1 μm to 1000 μm.

The electrode body 10 illustrated in FIG. 2C is provided with a cathode active material layer 13, the solid electrolyte layer 12, and an anode active material layer 14. The electrode active material layer in the present invention may be a cathode active material layer or an anode active material layer. In the former case, the type of the anode active material layer is not particularly limited. The anode active material layer contains at least an anode active material, and may further contain at least one of a sulfide solid electrolyte material, a conductive material, and a binder. Examples of the anode active material may include a carbon active material, an oxide active material, and a metal active material. Examples of the carbon active material may include mesocarbon microbeads (MCMB), high orientation property graphite (HOPG), hard carbon, and soft carbon. Examples of the oxide active material may include $Nb_2O_5$, $Li_4Ti_5O_{12}$, and SiO. Examples of the metal active material may include In, Al, Si, and Sn.

The electrode body may be provided with a current collector for collecting current from the electrode active material layer. Examples of a material of a cathode current collector may include SUS, aluminum, nickel, iron, titanium, and carbon. Examples of a material of an anode current collector may include SUS, copper, nickel, and carbon.

The electrode body in the present invention is usually used for a lithium battery. The lithium battery may be a primary battery or a secondary battery. In particular, a secondary battery is preferable since the secondary battery can be repeatedly charged and discharged and is useful as, for example, a battery mounted on a vehicle. Examples of the shape of the lithium battery may include a coin shape, a laminate shape, a cylinder shape, and a square shape. Further, the present invention can also provide a method for producing a lithium battery, the method comprising the heating step described above.

Incidentally, the present invention is not limited to the embodiments described above. The above embodiments are merely an exemplification and any of those having substantially the same constitution as the technical spirit described in Claims of the present invention and exhibiting the same working effects as those is included in the technical scope of the present invention.

EXAMPLES

Hereinafter, the present invention will be described in more detail by means of Examples.

Production Example $Li_2S$ (manufactured by NIPPON CHEMICAL INDUSTRIAL CO., LTD.), $P_2S_5$ (manufactured by Aldrich), LiI (manufactured by NIPPOH CHEMICALS CO., LTD.), and LiBr (manufactured by JAPAN PURE CHEMICAL CO., LTD.) were weighed so as to satisfy the composition of $10LiI \cdot 15LiBr \cdot 75\ (0.75Li_2S \cdot 0.25P_2S_5)$, and were mixed using an agate mortar for 5 minutes. Put in a vessel of planetary ball mill (45 cc, made of $ZrO_2$) was 2 g of this mixture was, dehydrated heptane (a moisture amount of 30 ppm or less, 4 g) was put therein, and $ZrO_2$ ball (ϕ=5 mm, 53 g) was put therein to hermetically seal the vessel completely. This vessel was mounted on a planetary ball mill machine (P7™ manufactured by FRITSCH JAPAN CO., LTD.) to perform mechanical milling for 20 hours at the number of weighing table revolutions of 500 rpm. Thereafter, drying at 110° C. was performed for 1 hour so as to remove heptane, thereby obtaining a coarse material of a sulfide solid electrolyte material.

Then, the obtained coarse material was pulverized into minute particles. Dehydrated heptane and dibutyl ether were mixed to the coarse material such that the total weight was adjusted to 10 g and the solid content concentration was adjusted to 10% by weight. The obtained mixture was put in a vessel of planetary ball mill (45 cc, made of $ZrO_2$), and $ZrO_2$ ball (ϕ=0.3 mm, 40 g) was put therein to hermetically seal the vessel completely. This vessel was mounted on a planetary ball mill machine (P7™ manufactured by FRITSCH JAPAN CO., LTD.) to perform mechanical milling for 20 hours at the number of weighing table revolutions of 150 rpm. Thereafter, drying was performed to obtain an amorphous sulfide solid electrolyte material ($D_{50}$=0.8 μm).

Evaluation

DTA analysis was performed for the obtained amorphous sulfide solid electrolyte material. The measurement was carried out using a TG-DTA apparatus (Thermo plus EVO™, manufactured by Rigaku Corporation). A sample dish made of aluminum was used and $\alpha$-$Al_2O_3$ powder was used as a reference sample. Used were 20 mg to 26 mg of a measurement samples, and the temperature was raised at 10° C./min from room temperature to 250° C. under Ar gas atmosphere to perform DTA analysis. The results thus obtained are shown in FIG. 3. As shown in FIG. 3, the crystallization onset temperature was about 140° C. and the crystallization peak temperature was about 160° C. For this reason, it was suggested that the heating temperature in the present invention is, for example, preferably 140° C. or higher. Similarly, it was suggested that the heating temperature in the present invention is, for example, preferably 160° C. or lower. This peak is a peak of the high Li ion conducting phase described above.

Comparative Example 1

Production of Cathode

The amorphous sulfide solid electrolyte material obtained in Production Example was calcined at 200° C. Weighed were 20.5 parts by weight of the obtained sulfide solid electrolyte material ($D_{50}$=0.8 μm), 100 parts by weight of $LiCo_{1/3}Ni_{1/3}Mn_{1/3}O_2$ ($D_{50}$=4 μm, manufactured by NICHIA CORPORATION), which has a coating layer (lithium niobate, an average thickness of 7 nm) on the surface thereof, as a cathode active material, and 2.0 parts by weight of vapor grown carbon fibers (registered trademark VGCF, manufactured by SHOWA DENKO K.K.) as a conductive material, and they were dispersed in butyl butyrate as a dispersion medium. Further, a PVDF solution (PVDF:butyl butyrate=5:95, weight ratio) was added as a binder thereto such that PVDF became 2.0 parts by weight. The obtained mixture was put in a vessel, dispersed at 30 seconds by means of an ultrasonic dispersion apparatus (UH-50™ manufactured by SMT Corporation), and subsequently shaken for 30 seconds by means of a shaker (TTM-1™ manufactured by SHIBATA SCIENTIFIC TECHNOLOGY LTD.), thereby obtaining a cathode slurry.

The obtained cathode slurry was applied to a cathode current collector (an aluminum foil to which carbon is applied, a thickness of 20 μm, SDX™ manufactured by SHOWA DENKO K.K.) by a doctor blade method, left to stand still for 30 minutes, and then dried at 100° C. for 30 minutes. The applied amount (coating weight) was adjusted such that the dried cathode active material layer became 18.1 mg/cm$^2$. Thereafter, the resultant product was cut into a circular form having an area of 1 cm$^2$, thereby obtaining a cathode.

Production of Anode

Weighed were 67.3 parts by weight of LiI—LiBr—$Li_2S$—$P_2S_5$ ($D_{50}$=1.5 μm) as a sulfide solid electrolyte material and 100 parts by weight of graphite ($D_{50}$=10 μm, manufactured by Mitsubishi Chemical Corporation) as an anode active material, and they were dispersed in butyl butyrate as a dispersion medium. Further, a PVDF solution (PVDF:butyl butyrate=5:95, weight ratio) was added as a binder thereto such that PVDF became 3.0 parts by weight. The obtained mixture was put in a vessel, dispersed at 30 seconds by means of an ultrasonic dispersion apparatus (UH-50™ manufactured by SMT Corporation), and subsequently shaken for 30 seconds by means of a shaker (TTM-1™ manufactured by SHIBATA SCIENTIFIC TECHNOLOGY LTD.), thereby obtaining an anode slurry.

The obtained anode slurry was applied to an anode current collector (a copper foil, a thickness of 10 μm) by a doctor blade method, left to stand still for 30 minutes, and then dried at 100° C. for 30 minutes. The applied amount (coating weight) was adjusted such that the dried anode active material layer became 13.7 mg/cm$^2$. Thereafter, the resultant product was cut into a circular form having an area of 1 cm$^2$, thereby obtaining an anode.

Production of Solid Electrolyte Layer weighed were 100 parts by weight of LiI—LiBr—$Li_2S$—$P_2S_5$ ($D_{50}$=2.5 μm) as a sulfide solid electrolyte material and dispersed in heptane as a dispersion medium. Further, a BR solution (butylene rubber solution, BR:heptane=5:95, weight ratio) was added as a binder thereto such that BR became 1.0 part by weight. Incidentally, the amount of the dispersion medium (heptane) was adjusted such that the solid content concentration became 39% by weight. The obtained mixture was put in a vessel, dispersed at 30 seconds by means of an ultrasonic dispersion apparatus (UH-50™ manufactured by SMT Corporation), and subsequently shaken for 5 minutes by means of a shaker (TTM-1™ manufactured by SHIBATA SCIENTIFIC TECHNOLOGY LTD.), thereby obtaining a slurry for forming a solid electrolyte layer.

The obtained slurry was applied to a substrate (an aluminum foil), left to stand still for 5 minutes, and then dried at 100° C. for 30 minutes. Thereafter, the resultant product was cut into a circular form having an area of 1 cm$^2$ and the substrate was peeled off, thereby obtaining a solid electrolyte layer.

Production of Battery

The obtained cathode, solid electrolyte layer, and anode were laminated in this order to form a laminated body. This laminated body was pressed at room temperature (25° C.) and at a pressure of 600 MPa. The pressed laminated body was accommodated in a battery case, and then a confining pressure of 1.5 MPa was applied to the battery case. Accordingly, a battery was obtained.

Comparative Example 2

A battery was obtained in the same manner as in Comparative Example 1, except that the amorphous sulfide solid electrolyte material obtained in Production Example was used as a sulfide solid electrolyte material used for the cathode active material layer.

Comparative Example 3

A battery was obtained in the same manner as in Comparative Example 2, except that the laminated body was pressed at 100° C.

Comparative Example 4

A battery was obtained in the same manner as in Comparative Example 2, except that the laminated body was pressed at 120° C.

Comparative Example 5

A battery was obtained in the same manner as in Comparative Example 2, except that the laminated body was pressed at 200° C.

Example 1

A battery was obtained in the same manner as in Comparative Example 2, except that the laminated body was pressed at 140° C.

Example 2

A battery was obtained in the same manner as in Comparative Example 2, except that the laminated body was pressed at 160° C.

Evaluation

Figure 4:
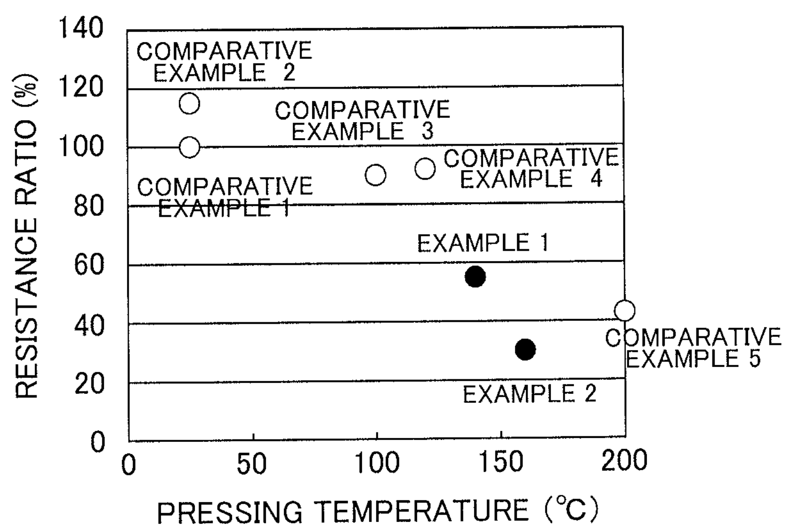
FIG. 4 shows the measurement result of internal resistance of a battery obtained in each of Examples 1 and 2 and Comparative Examples 1 to 5.

The battery obtained in each of Examples 1 and 2 and Comparative Examples 1 to 5 was subjected to charging and discharging treatment, and then adjusted to a predetermined voltage, and an internal resistance was measured. Specifically, the voltage was adjusted to 3.5 V, and then the discharging current was set to 19.2 mA so as to perform constant-current discharging for 5 seconds. The internal resistance was measured from the relation between a voltage drop amount and a discharging current at this time. The results thus obtained are shown in Table 1 and FIG. 4. Incidentally, a value (a resistance ratio) in Table 1 and FIG. 4 is a relative value in a case where the internal resistance of Comparative Example 1 is considered to be 100%.

Figure 5:
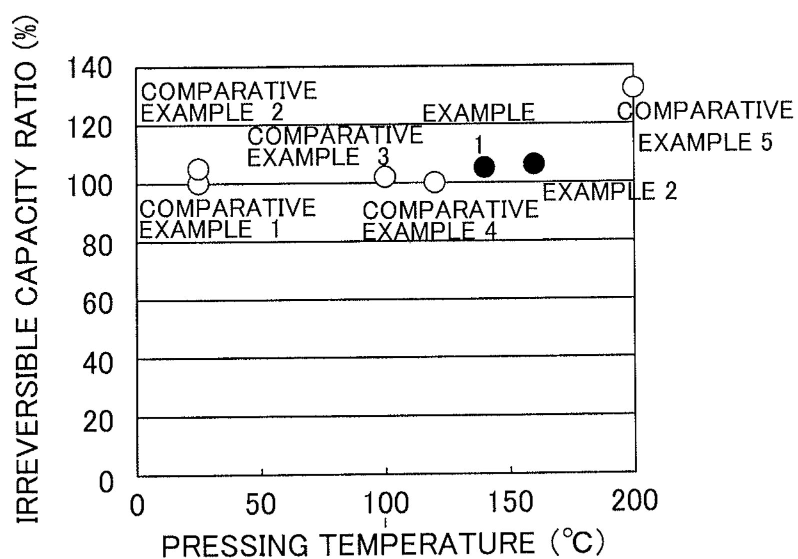
FIG. 5 shows the measurement result of irreversible capacity of a battery obtained in each of Examples 1 and 2 and Comparative Examples 1 to 5.

The battery obtained in each of Examples 1 and 2 and Comparative Examples 1 to 5 was subjected to charging and discharging treatment, and the irreversible capacity of the cathode active material was obtained. Specifically, charging and discharging were performed under the conditions including CCCV charging at 4.55 V and CCCV discharging at 30 V, and a difference between the charging capacity and the discharging capacity was designated as the irreversible capacity. The results thus obtained are shown in Table 1 and FIG. 5. Incidentally, a value (an irreversible capacity ratio)

in Table 1 and FIG. 5 is a relative value in a case where the irreversible capacity of Comparative Example 1 is considered to be 100%.

TABLE 1

| | Pressing Temperature (° C.) | Resistance Ratio (%) | Irreversible Capacity Ratio (%) |
|---|---|---|---|
| Comparative Example 1 | 25 | 100 | 100 |
| Comparative Example 2 | 25 | 115 | 103 |
| Comparative Example 3 | 100 | 92 | 102 |
| Comparative Example 4 | 120 | 94 | 101 |
| Example 1 | 140 | 56 | 105 |
| Example 2 | 160 | 30 | 106 |
| Comparative Example 5 | 200 | 44 | 132 |

As shown in Table 1 and FIG. 4, it was confirmed that the internal resistance in Examples 1 and 2 and Comparative Example 5 is reduced as compared to Comparative Examples 1 to 4. On the other hand, as shown in Table 1 and FIG. 5, it was confirmed that a decrease in capacity can be suppressed in Examples 1 and 2 as compared to Comparative Example 5.

REFERENCE SIGNS LIST

1 Oxide active material
2 Amorphous sulfide solid electrolyte material
10 Electrode body
11 Electrode active material layer
12 Solid electrolyte layer
13 Cathode active material layer
14 Anode active material layer

What is claimed is:

1. A method for producing an electrode body, comprising a heating step of heating an oxide active material and an amorphous sulfide solid electrolyte material in a state where the oxide active material and the amorphous sulfide solid electrolyte material are in contact with each other, wherein the oxide active material is a rock salt bed type active material, the sulfide solid electrolyte material contains a Li element, a P element, and a S element, and comprises an ion conductor containing $PS_4^{3-}$as a main component of an anion structure, LiI, and LiBr, and a heating temperature in the heating step is equal to or higher than a crystallization onset temperature of the sulfide solid electrolyte material and equal to or lower than a crystallization peak temperature of the sulfide solid electrolyte material, and is in the range of 140° C. to 180° C., the sulfide solid electrolyte material is formed from a raw material composition containing $Li_2S$, $P_2S_5$, LiI, and LiBr, the ratio of $Li_2S$ relative to the total of $Li_2S$ and $P_2S_5$ is in the range of 70 mol % to 80 mol %, the ratio of LiI in the sulfide solid electrolyte material is in the range of 1 mol % to 30 mol %, and the ratio of LiBr in the sulfide solid electrolyte material is in the range of 1 mol % to 30 mol %.

2. The method for producing an electrode body according to claim 1, wherein the oxide active material and the sulfide solid electrolyte material are pressed in the heating step.

3. The method for producing an electrode body according to claim 1, wherein the heating temperature in the heating step is in the range of 140° C. to 160° C.

4. The method for producing an electrode body according to claim 1, wherein the sulfide solid electrolyte material has a particulate shape.

5. The method for producing an electrode body according to claim 4, wherein the oxide active material and the sulfide solid electrolyte material are pressed in the heating step.

6. The method for producing an electrode body according to claim 4, wherein the heating temperature in the heating step is in the range of 140° C. to 160° C.

7. The method for producing an electrode body according to claim 2, wherein the pressure is in the range of 100 MPa to 1000 MPa.

8. The method for producing an electrode body according to claim 5, wherein the pressure is in the range of 100 MPa to 1000 MPa.

9. The method for producing an electrode body according to claim 1, wherein the sulfide solid electrolyte material contains no $Li_2S$.

10. The method for producing an electrode body according to claim 1, wherein the sulfide solid electrolyte material contains no cross-linking sulfur.

11. The method for producing an electrode body according to claim 1, wherein the ratio of $Li_2S$ relative to the total of $Li_2S$ and $P_2S_5$ is in the range of 72 mol % to 78 mol %, the ratio of LiI in the sulfide solid electrolyte material is in the range of 10 mol % to 25 mol %, and the ratio of LiBr in the sulfide solid electrolyte material is in the range of 10 mol % to 25 mol %.

12. The method for producing an electrode body according to claim 11, wherein the ratio of $Li_2S$ relative to the total of $Li_2S$ and $P_2S_5$ is in the range of 74 mol % to 76 mol %.

13. The method for producing an electrode body according to claim 1, wherein the rock salt bed type active material is selected from the group consisting of $LiCoO_2$, $LiNiO_2$, $LiMnO_2$, $LiCo_{1/3}Ni_{1/3}Mn_{1/3}O_2$, $LiVO_2$, and $LiCrO_2$.

14. The method for producing an electrode body according to claim 13, wherein the rock salt bed type active material has a coating layer configured by an ion conductive oxide on the surface thereof and having the formula: $Li_xAO_y$, wherein A represents B, C, Al, Si, P, S, Ti, Zr, Nb, Mo, Ta, or W, and "x" and "y" represent positive numbers.

15. The method for producing an electrode body according to claim 14, wherein the ion conductive oxide is selected from the group consisting of $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$, and $Li_2WO_4$.

16. The method for producing an electrode body according to claim 1, wherein the sulfide solid electrolyte material has the formula $10LiI\cdot 15LiBr\cdot 75\ (0.75Li_2S\cdot 0.25P_2S_5)$.

17. The method for producing an electrode body according to claim 1, wherein the rock salt bed type active material contains Co, Mn and Ni.

18. The method for producing an electrode body according to claim 16, wherein the rock salt bed type active material contains Co, Mn and Ni.

19. The method for producing an electrode body according to claim 1, wherein the rock salt bed type active material is $LiCo_{1/3}Ni_{1/3}Mn_{1/3}O_2$.

20. The method for producing an electrode body according to claim 16, wherein the rock salt bed type active material is $LiCo_{1/3}Ni_{1/3}Mn_{1/3}O_2$.

* * * * *